United States Patent [19]

Tucker

[11] 4,413,833
[45] Nov. 8, 1983

[54] TWO-WHEEL HAND TRUCK

[76] Inventor: Wayne R. Tucker, P.O. Box 512, Volga, S. Dak. 57071

[21] Appl. No.: 239,525

[22] Filed: Mar. 2, 1981

[51] Int. Cl.³ .............................................. B62B 1/02
[52] U.S. Cl. ................................................ 280/47.22
[58] Field of Search .............. 280/47.29, 47.27, 47.28, 280/47.24, 43.1, 47.21, 47.22, 65

[56] References Cited

U.S. PATENT DOCUMENTS

| 429,784 | 6/1890 | Turner | 280/65 |
|---|---|---|---|
| 1,422,893 | 7/1922 | Showalter | 280/47.22 |
| 2,485,085 | 10/1949 | Burch | 280/47.22 |
| 2,650,834 | 9/1953 | Coval | 280/47.22 |
| 3,157,411 | 11/1964 | Rhodes | 280/47.29 |
| 3,711,111 | 1/1973 | Crawford | 280/47.22 |

FOREIGN PATENT DOCUMENTS

| 1281274 | 10/1968 | Fed. Rep. of Germany | 280/47.22 |
|---|---|---|---|
| 1507340 | 11/1967 | France | 280/47.27 |

Primary Examiner—David M. Mitchell
Attorney, Agent, or Firm—Burd, Bartz & Gutenkauf

[57] ABSTRACT

A two-wheel hand truck has a frame secured to a bottom plate and forks to support a load in front of the frame. A mount assembly attached to the plate has supports for an oscillating axle. The supports have upright slots accommodating the axle allowing limited relative vertical movement between the axle and the supports. Wheels rotatably mounted on opposite ends of the axle support the truck on a surface. A shaft assembly rotatably mounted on the supports is connected with arms to the axle. A spring unit mounted on the shaft assembly applied torque to the axle to bias the frame to an upright loading position. An angle member secured to the supports covers the axle and spring unit and functions as a foot rest.

31 Claims, 14 Drawing Figures

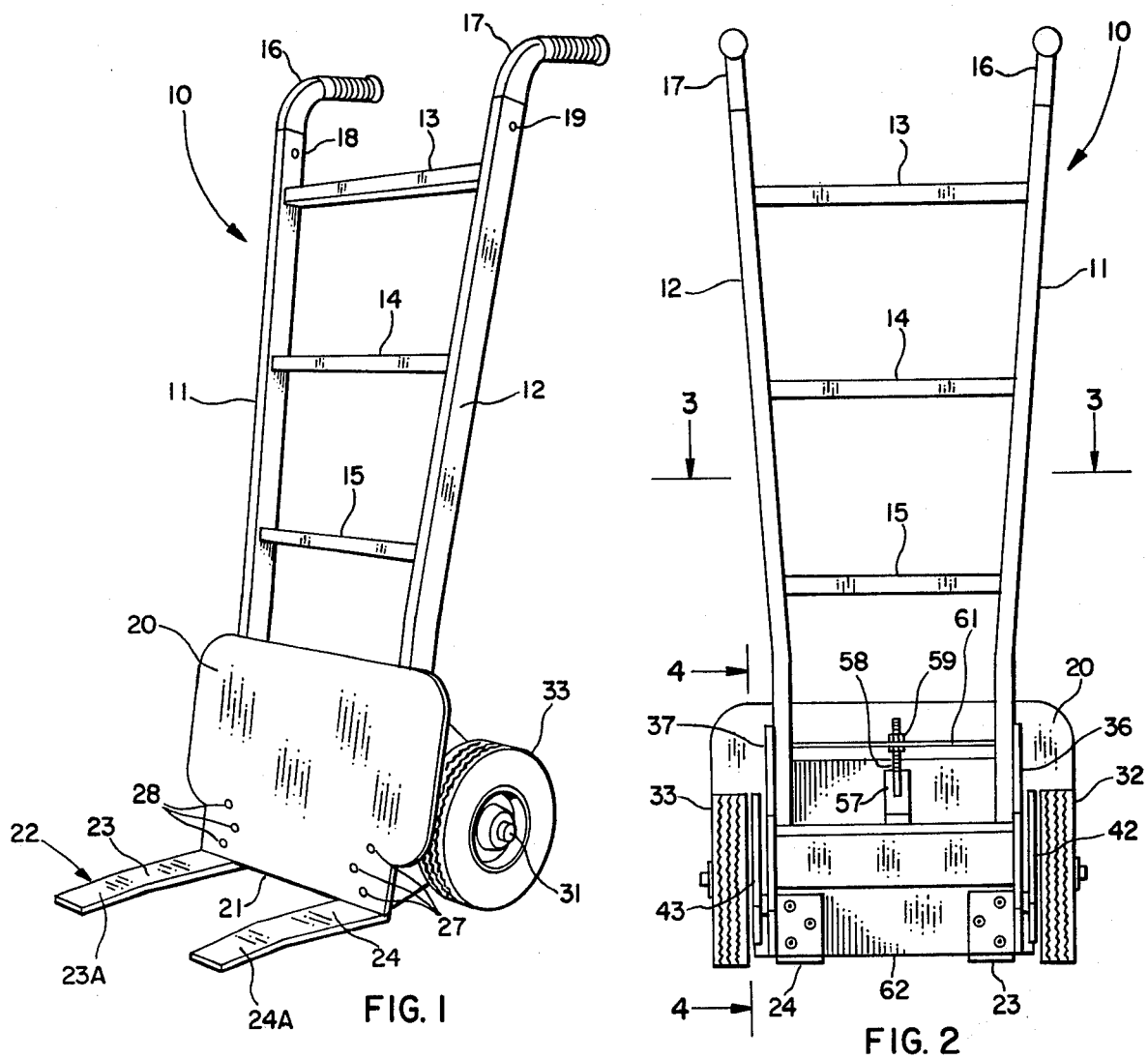
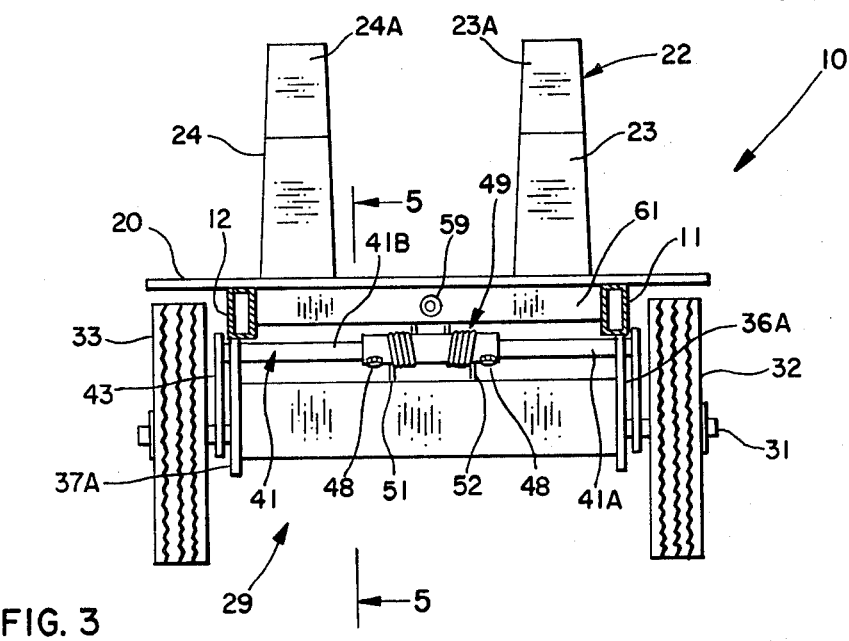

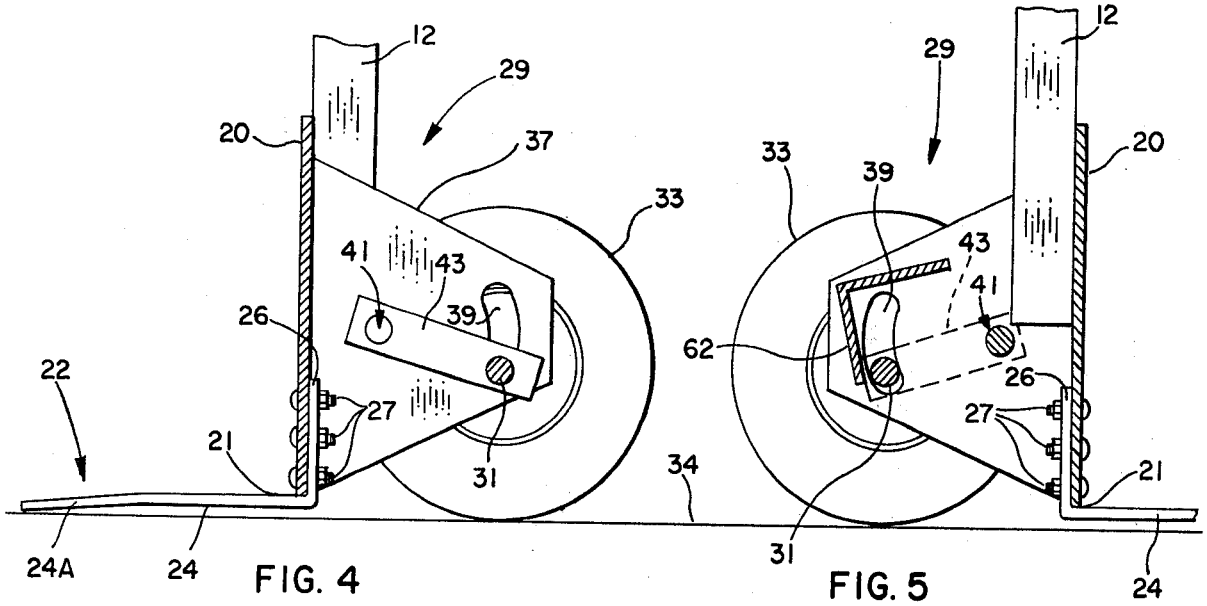
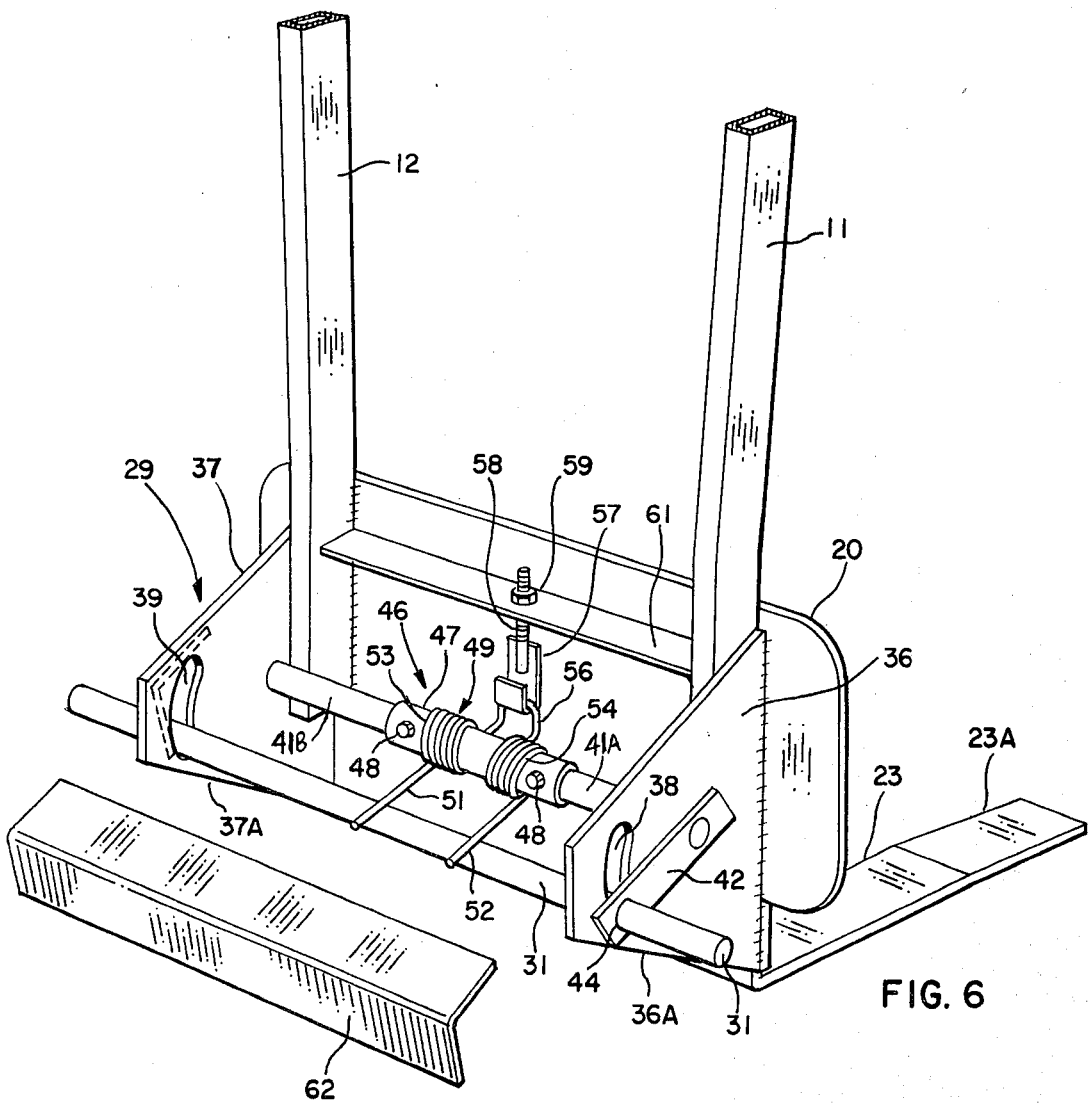

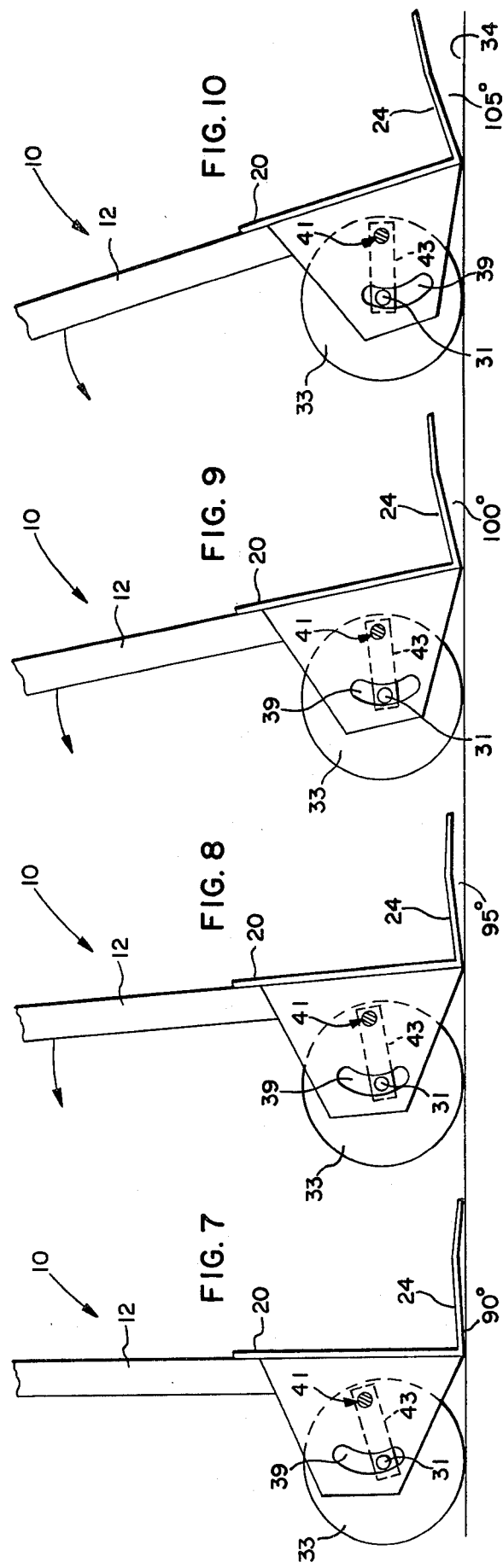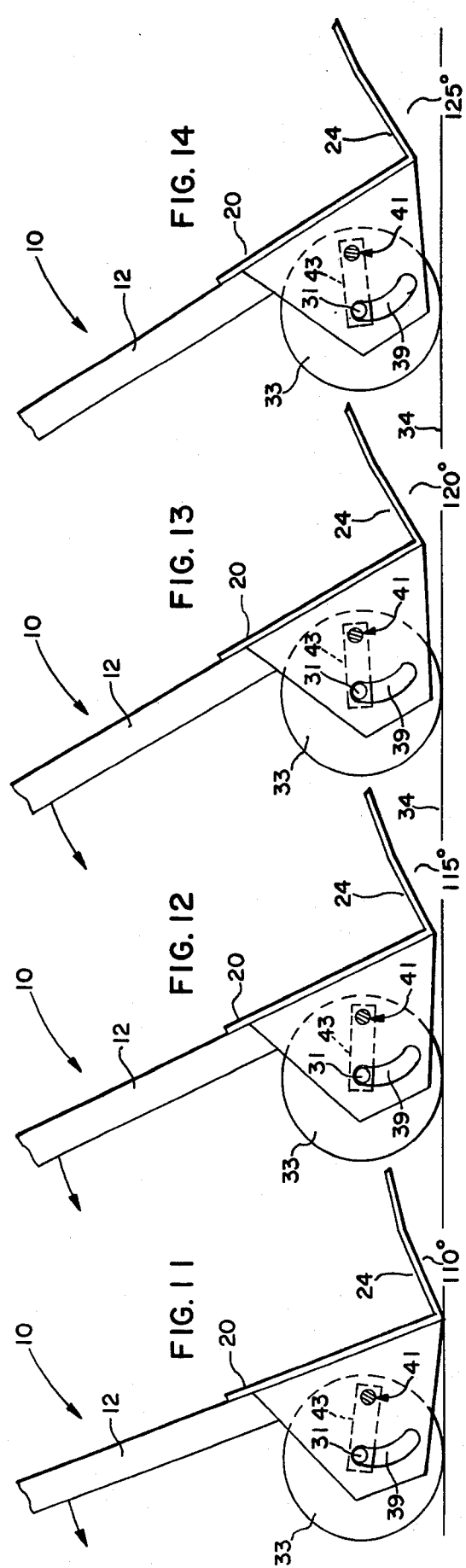

TWO-WHEEL HAND TRUCK

SUMMARY OF INVENTION

The invention is directed to a two-wheel hand truck used as a manually moved vehicle for transporting freight, boxes, bags of feed and seed, and like objects. The truck has a generally upright rigid frame comprising upright side members secured together with cross members. The upper ends of the side members are attached to handles. A plate is secured to the lower end of the side members. Load carrying means is attached to the plate. The load carrying means can be pallet or bag forks or a generally flat platform. The truck is movably supported by a pair of wheels rotatably mounted on a transverse axle. A mount assembly operatively connects the axle to the plate. The mount assembly allows limited vertical oscillating movement of the axle. A biasing means associated with the mount assembly and the axle biases the axle in a downward direction and yieldably holds the frame in a generally upright loading position. The truck is loaded with the frame in the upright position.

The mount assembly includes a pair of rearwardly directed supports attached to the plate. Each support has an upright arcuate slot accommodating opposite portions of the axle. The slot allows the axle to have limited upright oscillating movement. A shaft assembly rotatably mounted on the supports is connected to the axle with separate arms. The biasing means comprises a coil spring located about the shaft assembly. One end of the coil spring engages the axle to bias the axle in a downward direction. The opposite end of the spring is attached to an adjustable member mounted on the frame. The adjustable member is used to change the biasing force of the spring. The shaft assembly comprises first and second shafts that are rotatably mounted on the supports. The adjacent ends of the shafts are connected together with a sleeve. Arms attached to the outer ends of the shafts are connected to opposite ends of the axle. The biasing means is a spring unit that surrounds the sleeve so that when the wheels contact a supporting surface, the spring unit biases the frame to a generally upright position. The load support means extended forwardly from the plate function as stops that cooperate with the wheels to stabilize the frame in the upright loading position.

The truck is loaded with the frame in the upright position. This prevents the frame from tipping, since the weight of the load is not transmitted to the frame. When the truck is loaded, the operator places his foot on a foot rest located over the axle and pulls rearwardly on the frame. The frame pivots on the supporting surface and moves against the biasing force of the biasing unit. As the frame and load move rearwardly or to the tilt or transport position, the axle moves upwardly of the slot until it engages the top of the slot. At this point, the weight of the load and frame are transferred to the axle and wheels as the frame pivots about the axis of the axle. The lower end of the frame and load support means is raised from the supporting surface. The truck frame continues to move rearwardly until the load is balanced on the wheels. The truck is then pushed to the desired location where the frame is moved forwardly to deposit or park the load on the supporting surface. The lower end of the frame will engage the supporting surface. The biasing means will bias the wheels into engagement with the supporting surface until the load support means engage the supporting surface. The frame is then in the upright position so that the load support means can be removed from under the load.

An object of the invention is to provide a two-wheel hand truck with an oscillating spring-biased axle for coupling the wheels to the frame in a manner that reduces the effort to tip the load to its balance point. A further object of the invention is to provide a hand truck that can be loaded while the frame of the truck is in a generally upright position. Another object of the invention is to provide a hand truck with a mount assembly for an oscillating axle that includes a pair of shafts that are coupled together with a sleeve supporting a biasing spring unit. The shafts and sleeve can be disassembled from each other to provide a shaft assembly and biasing unit that can be readily assembled and disassembled. A further object of the invention is to provide a hand truck with an oscillating axle that is biased in a downward direction and with means for adjusting the biasing force on the axle. Another object of the invention is to provide a two-wheel hand truck that is sturdy in construction, durable in use, and economical in cost. These and other advantages of the hand truck of the invention are set out in the following detailed description of the hand truck.

IN THE DRAWINGS

FIG. 1 is a perspective view of a two-wheel hand truck of the invention;

FIG. 2 is a rear elevational view of the hand truck of FIG. 1;

FIG. 3 is an enlarged sectional view taken along the line 3—3 of FIG. 2;

FIG. 4 is an enlarged sectional view taken along the line 4—4 of FIG. 2;

FIG. 5 is an enlarged sectional view taken along the line 5—5 of FIG. 3;

FIG. 6 is an exploded perspective view of the oscillating axle and lower frame of the hand truck of FIG. 1;

FIG. 7 is a fragmentary diagrammatic side elevational view of the hand truck with the handle frame in the upright loading position; and FIGS. 8-14 are diagrammatic side elevational views of the hand truck similar to FIG. 7, showing the frame moved in successive 5-degree positions from the upright loading position to the inclined transport position.

DESCRIPTION OF PREFERRED EMBODIMENT

Referring to FIGS. 1-3, there is shown a two-wheel hand truck of the invention indicated generally at 10 for transporting objects, such as bags, boxes, pallets and like objects. Truck 10 has a frame comprising upwardly diverging side members or rails 11 and 12 connected to each other with a plurality of laterally spaced cross members 13, 14, and 15. Rails 11 and 12 and members 13, 14, and 15 are tubular metal frame members. Handles or hand grips 16 and 17 extend upwardly from the upper ends of rails 11 and 12. Fasteners 18 and 19, such as pins or nut and bolt assemblies, secure handles 16 and 17 to rails 11 and 12. Rails 11 and 12 are elongated linear box-shaped tubular metal members, such as tubular steel. Handles 16 and 17 have end portions that project up into the upper ends of the rails and rearwardly curved hand grips. The lower ends of rails 11 and 12 are secured by welds or the like to a transverse plate 20. Plate 20 is a flat metal plate having a lower transverse edge 21. Edge 21 extends generally parallel to the truck support surface 34. Opposite portions of plate 20 project outwardly from rails 11 and 12.

An object support means indicated generally at 22 is secured to and projects forwardly from the bottom of plate 20. Object support means 22, as shon in FIGS. 1-5, comprise a pair of lift members or forwardly directed forks 23 and 24. Forks 23 and 24 are generally flat plate members having front downwardly directed lips 23A and 24A. Finger 24 has an upright back 26 located adjacent the back of plate 20 and attached thereto with nut and bolt assemblies 27. Plate 23 has a similar upright back attached with nut and bolt assemblies 28 to plate 20. Forks 23 and 24 can be removed from plate 20 and replace with a box plate (not shown). The box plate has a generally flat platform having a transverse upwardly directed flange. The flange is attached to the back of plate 20 with a plurality of nut and bolt assemblies, such as the nut and bolt assemblies 27 and 28. Other types of object support means, such as box carriers and barrel carriers, can be attached to plate 20.

A mount assembly indicated generally at 29 connects a transverse axle 31 to plate 20. Wheels 32 and 33 are rotatably mounted on opposite ends of axle 31. Wheels 32 and 33 have pneumatic tires that rotatably support the truck 10 on ground or support surface 34. Wheels 32 and 33 can have hard rubber treads. Roller bearings (not shown) rotatably mount the hub structures of wheels 31 and 32 on axle 31. Retainers, as nuts or cotter pins, hold wheels 31 and 32 on axle 31.

Mount assembly 29 comprises a pair of rearwardly directed side supports or plates 36 and 37. Plate 36 has a forward portion located adjacent the outside of rail 11 and secured by welds or the like to the back of plate 20. Plate 36 can also be secured to the lower end of rail 11. Plate 37 has a forward portion secured by welds or the like to the back of plate 20. Plate 37 can also be secured to the lower end of rail 12. Plates 36 and 37 have upwardly and outwardly directed rearward lower edges 36A and 37A which allow the truck to pivot about axle 31 between an upright load position and a rearward load carrying or transport position. Side member 36 has an upwardly directed arcuate slot 38 accommodating an end portion of axle 31. A similar upwardly directed arcuate slot 39 is located in the rear portion of plate 37. The opposite end of axle 31 projects through slot 39. Slots 38 and 39 are elongated arcuate openings transversely aligned with each other. Each slot 38 and 39 has an arcuate length of about 35 degrees. The arcuate length of slots 38 and 39 can vary to alter the amount of relative movement between axle 31 and plates 36 and 37. Each slot 38 and 39 has a width greater than the diameter of shaft 31 to allow the shaft 31 to freely move between the opposite or upper and lower ends of the slots. The slots 38 and 39 permit axle 31 to move from the bottom or lower to the top or upper ends of slots 38 and 39, as hereinafter described. Slots 38 and 39 and the inner and outer edges thereof each have a radius that centers on the transverse axis of a shaft assembly 41. In other words, the axis of shaft assembly 41 is the radial center of the arc of slots 38 and 39. Shaft assembly 41, as shown in FIGS. 3 and 6, has opposite ends 41A and 41B extending through holes in side members 36 and 37. The opposite ends of shaft assembly 41 are first and second rod-like or tubular shaft members 41A and 41B joined together with a sleeve 47. Fastening members 48, bolts or set screws, secure sleeve 47 to shaft members 41A and 41B. Member 41A projects through a hole on plate 36 and rotates relative to plate 36. The inner end of member 41A telescopes into sleeve 47. Member 41B projects through a hole in plate 37 and rotates relative to plate 37. Members 41A and 41B rotae together about a common transverse axis located forward of and parallel to the axis of axle 31.

Arms 42 and 43 are secured to opposite ends 41A and 41B of shaft assembly 41. Arm 42 has a hole 44 accommodating an end of axle 31. Arm 43 has a similar hole accommodating the opposite end of axle 31. The diameter of the holes in rear ends of arms 42 and 43 is slightly larger than the diameter of axle 31 to allow arms 42 and 43 to be removed from axle 31. When fasteners 48 are released, shaft members 41A and 41B can be removed from sleeve 47 and plates 36 and 37.

A biasing means indicated generally at 46 functions to continuously bias axle 31 in a downward direction to locate axle 31 in the bottom of slots 38 and 39. Biasing means 46 comprises a biasing spring unit 49 having a pair of spring arms 51 and 52 engageable with the top of a mid-section of axle 31. Arms 51 and 52 are connected to coil bodies or springs 53 and 54 located about sleeve 47. Springs 53 and 54 are telescoped over or coiled about sleeve 47. After one of the shaft members 41A or 41B has been removed from sleeve 47 and fastener 48 removed from sleeve 47, the entire biasing means 46 can be removed from the truck. This facilitates assembly and replacement of biasing means 46. A U-shaped head 56 is secured to the ends of bodies 53 and 54. An upwardly open hook 57 engages the U-shaped head 56. A bolt or threaded member 58 projected through a hole in the center of transverse fixed brace 61 is connected to hook 57. Opposite ends of brace 61 are secured by welds or the like to rails 11 and 12. A nut 59 threaded onto bolt 58 is used as an adjustment means to adjust the biasing force of springs 53 and 54. When nut 59 is threaded onto bolt 58, the head 56 is moved in an upward direction. This increases the biasing force of coil springs 53 and 54 and thereby causes arms 51 and 52 to exert a greater downwardly directed biasing force on axle 31. Biasing means 46 functions to automatically return and hold the truck frame in its loading upright or 90-degree position, as shown in FIGS. 4–7. In the loading position, the frame is upright or vertical and the forks 23 and 24 and wheels 32 and 33 engage the supporting surface 34.

As shown in FIGS. 2, 3, 5, and 6, a right angle member 62 extended between plates 36 and 37 is secured thereto by welds or the like. Angle member 62 covers the transverse axle 31 and portions of spring arms 51 and 52. Member 62 has a top portion covering the top of axle 31 and upper ends of slots 38 and 39 and back portion extended downwardly adjacent the rear of slots 38 and 39. Member 62 shields the user's feet from the oscillating axle 31 and moving spring arms 51 and 52. The angle member 62 also functions as a foot or step plate. The operator of the truck can place a foot on member 62 to facilitate the tilting of the frame from a generally upright position to the inclined transport position, as shown in FIG. 14.

In use, truck frame 12, as shown in FIG. 7, is in a generally upright loading position. Forks 23 and 24 are generally horizontal and in engagement with supporting surface 34. Biasing means 46 bias wheels 31 and 32 in engagement with the support surface 34. This stabilizes frame 12 in the generally upright loading position. The loads, such as bags of feed or fertilizer, are loaded onto the top of forks 23 and 24 adjacent the front side of plate 20 and frame 12. The load does not tip frame 12, as the load is vertical.

When truck 10 is loaded, the operator places a foot on transverse member 62 and pivots frame 12, as shown in FIG. 8, in a rearward direction. The frame 12 pivots on the lower end of plate 20 and the ends of the frame and side members that engage the supporting surface 34. Wheels 31 and 32 remain in contact with supporting surface 34. The load pivots around the contact point of the lower ends of the frame, as shown in FIGS. 8, 9, 10, and 11. This pviotal action is from about the 90-degree position to the 110-degree position. At this time, axle 31 engages the portions of the plates 36 and 37 that provide the upper ends of slots 38 and 39. The pivoting force of the load is transferred from the lower ends of the frame or plate 20 to axle 31. In FIG. 12, the center of gravity of the load on the forks 23 and 24 is slightly in front of axle 31. As the frame 12 is moved or tilted rearwardly, as shown in FIGS. 13 and 14, the center of gravity of the load moves toward and into alignment with axle 31. When the center of gravity of the load is vertically aligned with axle 31, the loaded truck is at its balance point. The truck is then manually moved to transport the load to a desired location.

The load is removed from the truck by tilting the frame 12 in a forward direction. The foot of the operator is placed on transverse member 62 to prevent the truck from rolling rearwardly. As frame 12 is moved in a forward direction, the lower ends of the frame 12 and plate 20 will engage supporting surface 34, as shown in FIG. 11. Continued forward pivotal movement of frame 12 will pivot the load on the supporting surface until the load is in a generally vertical position. When the load is in the vertical park position, the forks 23 and 24 are moved linearly along the surface away from the load. The truck 10 is then manually moved to a location to pick up a second load.

While there has been shown and described the preferred embodiment of the hand truck of the invention, it is understood that changes in the structure, wheels, frame and other components, size of structure, and types of biasing means may be made by those skilled in the art without departing from the invention. The invention is defined in the following claims.

The embodiments of the invention in which an exclusive property or privilege is claimed are defined as follows:

1. A hand truck comprising: a frame movable between a generally upright loading position and a rearwardly inclined transport position, said frame having side members, each side member having an upper end and a lower end, cross members secured to the side members between the upper and lower ends thereof, handle means attached to the upper ends of the side members, plate means attached to the lower ends of the side members, support means attached to the plate means for holding at least one object adjacent said plate means, wheel means to movably support the truck on a surface, axle means rotatably supporting the wheel means, mount means connecting the axle means to the plate means, said mount means including support members secured to the plate means and projected rearwardly therefrom, said support members having upwardly directed slots, said axle means extended through said slots whereby the axle means has limited generally vertical oscillating movement, shaft means rotatably mounted on the support members and extended generally parallel to the axle means, arm means secured to the shaft means and axle means whereby movement of the axle means in the slots rotates the shaft means, and biasing means mounted on the shaft means and engageable with the axle means operable to bias the axle means in a downward direction and hold the frame in its generally upright loading position.

2. The truck of claim 1 wherein: the plate means is a generally flat plate secured to the lower ends of the side members, said plate projected outwardly from each of the side members.

3. The truck of claim 2 wherein: said wheel means are located behind the plate.

4. The truck of claim 1 wherein: said support members comprise a pair of plates secured to the plate means, said plates being laterally spaced from each other and projected rearwardly from the plate means, each of said plates having one of said upwardly directed slots.

5. The truck of claim 1 wherein: each of said slots has an elongated arcuate shape.

6. The truck of claim 5 wherein: said shaft means has a transverse axis of rotation, said axis being the radial center of the arc of said slots.

7. The truck of claim 1 wherein: said biasing means has second arm means engageable with the axle means, coil body means connected to the second arm means, and head means connected to the body means, and means mounted on the frame for holding the head means whereby the coil body means biases the second arm means into engagement with the axle means.

8. The truck of claim 1 including: means for adjusting the biasing force of the biasing means to vary the biasing force on the axle means.

9. A hand truck comprising: a frame movable between a generally upright loading position and a rearwardly inclined transport position, said frame having side members, each side member having an upper end and a lower end, cross members secured to the side members between the upper and lower ends thereof, handle means attached to the upper ends of the side members, plate means attached to the lower ends of the side members, support means attached to the plate means for holding at least one object adjacent said plate means, wheel means to movably support the truck on a surface, axle means rotatably supporting the wheel means, mount means connecting the axle means to the plate means, said mount means including support members secured to the plate means and projected rearwardly therefrom, said support members having upwardly directed slots, said axle means extended through said slots whereby the axle means has limited generally vertical oscillating movement, shaft means rotatably mounted on the support members and extended generally parallel to the axle means, arm means secured to the shaft means and axle means whereby movement of the axle means in the slots rotates the shaft means, and biasing means mounted on the shaft means and engageable with the axle means operable to bias the axle means in a downward direction and hold the frame in its generally upright loading position, said biasing means comprising second arm means engageable with the axle means, coil body means connected to the second arm means, and head means connected to the body means, and means mounted on the frame for holding the head means whereby the coil body means biases the second arm means into engagement with the axle means, said means for holding the head means includes adjustable means for varying the biasing force of the coil body means thereby adjusting the biasing force of the second arm means on the axle means.

10. The truck of claim 9 wherein: said adjustable means includes threaded means, and means connecting the threaded means to the head means.

11. The truck of claim 9 wherein: said second arm means comprise a pair of arms engageable with opposite portions of the axle means, said coil body means comprise a pair of coil springs surrounding the shaft means, each coil spring being connected to an arm and the head means.

12. The truck of claim 11 wherein: said means for holding the head means includes adjustable means for varying the biasing force of the coil springs, said adjustable means including threaded means cooperating with a cross member of the frame, and means connecting the threaded means to the head means whereby adjustment of the threaded means adjusts the biasing force of the coil springs.

13. The truck of claim 9 including: a sleeve surrounding a mid-section of the shaft means, said coil springs surrounding said sleeve.

14. The truck of claim 9 including: a transverse member located over the axle means between the wheel means, said transverse member being secured to the support members.

15. The truck of claim 9 wherein: said support members comprise a pair of plates secured to the plate means and projected rearwardly therefrom, said plates being laterally spaced from each other, each of said plates having one of said slots, and a transverse member extended between and secured to the plates, said transverse member being located over the axle.

16. The truck of claim 15 wherein: the transverse member is an angle member located over the top and adjacent the rear of the slots in the plates.

17. The truck of claim 9 wherein: the support means includes a plurality of forks projected generally normal from the plate means, and means connecting the support means to the plate means.

18. A hand truck comprising: a frame movable between a generally upright loading position and a rearwardly inclined transport position, said frame having side members, each side member having an upper end and a lower end, cross members secured to the side members between the upper and lower ends thereof, handle means attached to the upper ends of the side members, plate means attached to the lower ends of the side members, support means attached to the plate means for holding at least one object adjacent said plate means, wheel means to movably support the truck on a surface, axle means rotatably supporting the wheel means, mount means connecting the axle means to the plate means, said mount means including support members secured to the plate means and projected rearwardly therefrom, said support members having upwardly directed slots, said axle means extended through said slots whereby the axle means has limited generally vertical oscillating movement, shaft means rotatably mounted on the support members and extended generally parallel to the axle means, arm means secured to the shaft means and axle means whereby movement of the axle means in the slots rotates the shaft means, and biasing means mounted on the shaft means and engageable with the axle means operable to bias the axle means in a downward direction and hold the frame in its generally upright loading position, said shaft means comprise a first shaft, a second shaft axially aligned with the first shaft, a sleeve releasably connected to adjacent ends of the first and second shafts, said biasing means being removably mounted on said sleeve and engageable with the axle means to bias the axle means in a downward direction.

19. The truck of claim 18 wherein: the biasing means includes a coil spring located about the sleeve.

20. The truck of claim 18 wherein: the biasing means includes a coil spring located about the sleeve, said coil spring having a first end and a second end, said biasing means including arm means connected to the first end of the coil spring and engageable with the axle means, and a head means connected to the second end of the coil spring, and means mounted on the frame for holding the head means whereby the coil spring biases the arm means into engagement with the axle means.

21. The truck of claim 20 wherein: said means for holding the head means includes adjustable means for varying the biasing force of the coil spring thereby adjusting the biasing force of the arm means on the axle means.

22. The truck of claim 18 including: transverse means secured to the support means, said transverse means being located over the axle means to provide a shielf and foot rest for the user of the truck.

23. A hand truck comprising: a frame, means attached to the frame for supporting a load, an axle, wheel means rotatably mounted on the axle, a mount assembly attached to the frame mounting the axle for oscillatory movement relative to the frame, said mount assembly having means accommodating the axle and allowing limited general vertical oscillating movement of the axle, and biasing means for biasing the axle in a downward direction and holding the frame in a generally upright loading position, said means of the mount assembly includes supports attached to the frame, shaft means rotatably mounted on the supports, said supports having generally upright slots accommodating the axle allowing limited general vertical oscillating movement of the axle, and arm means connecting the shaft means to the axle, said biasing means comprising a spring unit having coil body means surrounding the shaft means, second arm means connected to the coil body means engageable with the axle, and head means connected to the body means, and means for holding the head means whereby the coil body means biases the second arm means into engagement with the axle to bias the axle in a downward direction, said shaft means comprising a first shaft and a second shaft, and sleeve means attached to the first and second shafts, said coil body means being located about the sleeve means.

24. The truck of claim 23 wherein: each of said slots has an elongated arcuate shape.

25. The truck of claim 24 wherein: said shaft means has a transverse axis of rotation, said axis being the radial center of the arc of said slots.

26. The truck of claim 23 wherein: said biasing means has arm means engageable with the axle, coil body means connected to the arm means, and head means connected to the body means, and means mounted on the frame for holding the head means whereby the coil body means biases the arm means into engagement with the axle.

27. The truck of claim 26 wherein: said means for holding the head means includes adjustable means for varying the biasing force of the coil body means thereby adjusting the biasing force of the arm means on the axle.

28. The truck of claim 26 wherein: said arm means comprise a pair of arms engageable with opposite portions of the axle means, said coil body means comprise a pair of coil springs, each coil spring being connected to an arm and the head means.

29. The truck of claim 23 including: a transverse member located over the axle between the wheel means, said transverse member being secured to the mount assembly.

30. The truck of claim 23 wherein: said mount assembly has support members comprising a pair of plates secured to the plate means and projected rearwardly therefrom, said plates being laterally spaced from each other, each of said plates having one of said slots, and a transverse member extended between and secured to the plates, said transverse member being located over the axle.

31. The truck of claim 30 wherein: the transverse member is an angle member located over the top and adjacent the rear of the slots in the plates.

* * * * *